Oct. 17, 1944. E. G. HARMAN 2,360,563

FISH LURE

Filed Feb. 11, 1943

Inventor

Ervin G. Harman

By Clarence A. O'Brien
and Harvey B. Jacobson
Attorneys

Patented Oct. 17, 1944

2,360,563

UNITED STATES PATENT OFFICE 2,360,563

FISH LURE

Ervin G. Harman, Elkins, W. Va.

Application February 11, 1943, Serial No. 475,532

1 Claim. (Cl. 43—46)

This invention relates to new and useful improvements in fish plugs or lures, the principal object of the present invention being to provide a fish plug with a spoon-like structure in order to cause the plug or lure to perform right and left irregular movements or antics in water in order to attract live fish.

Another important object of the invention is to provide an improved fish lure constructed in such a manner as to perform unusual fish life simulating antics and to produce a water surface bubbling action.

Other objects and advantages of the invention will become apparent to the reader of the following description.

Figure 1:
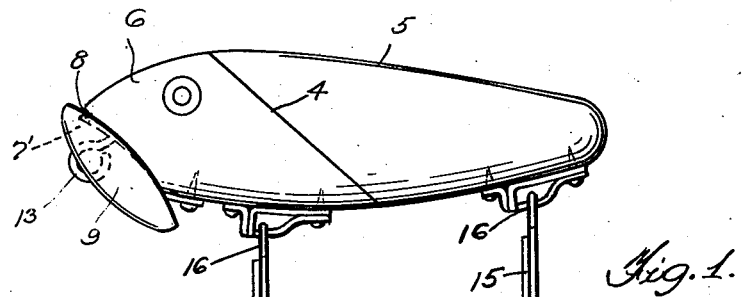
Figure 1 is a side elevational view of the lure.
Figure 2:
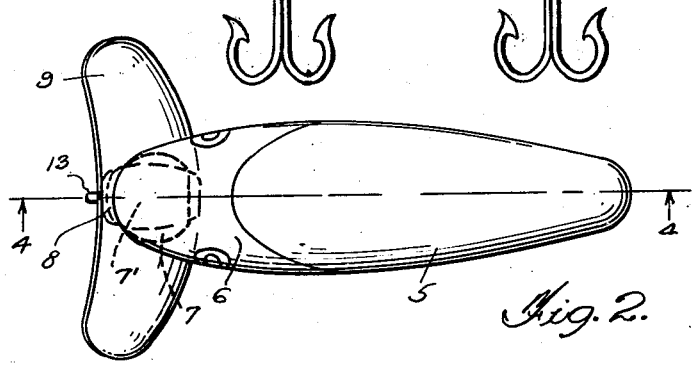
Figure 2 is a top plan view.
Figure 3:
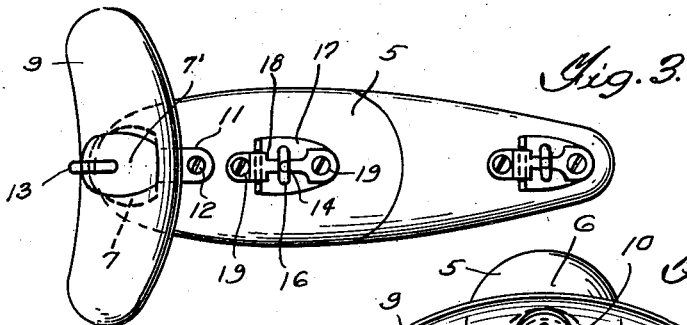
Figure 3 is a bottom plan view with portions of the hooks removed.
Figure 5:
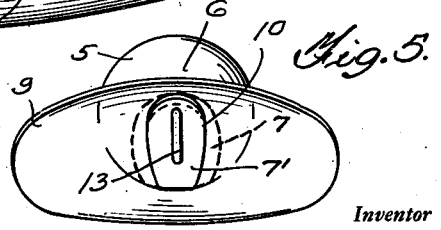
Figure 5 is a front elevational view of the lure with the hooks removed.
Figure 4:
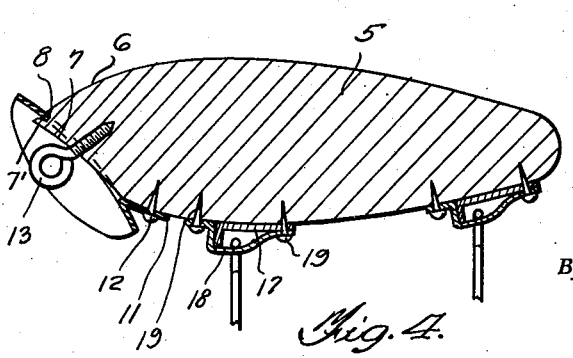
Figure 4 is a section on the line 4—4 of Figure 2.

Referring to the drawing wherein like numerals designate like parts, it can be seen that numeral 5 denotes a rearwardly tapering body which can be constructed of wood or any other suitable material and which has its front end defining a head portion 6 by the inclined line indicated at 4, the front end of the head being formed with a slightly curved undercut front surface 7 (see Fig. 4). An oval-shaped lug 7' projects from the relatively flat front surface 7 of the head portion, the lower edge of the lug tapering to merge with the surface 7.

Numeral 9 denotes a spoon or plate which is both longitudinally and transversely curved with the convex side of the same opposing the front surface 7 of the head of the body 5. This spoon 9 has a transversely disposed and ovate-shaped opening 10 for receiving the lug 7' with the edge portion of the plate 9 at the upper edge of the opening disposed into the channel 8, and as can be seen in Figure 4. When the opening 10 is formed or struck from the spoon 9 a sufficient amount can be left to form a lug 11 which is disposed backwardly under the head portion 6 of the body 5. This lug 11 has an aperture therein to receive a tack or other securing element 12 which is driven into the body of the lure.

A screw eye 13 is disposed into the head portion 6 of the lure through the opening 10 in the spoon 9.

Reference characters 14, 15 denote hooks and each of these has an eye 16.

Hangers are provided for these hooks, each hanger comprising an L-shaped plate 17 and a retaining member 18 is disposed over the depending flange of the plate 17, the member 18 having its end portions secured to the body 5 by tacks or other securing elements 19, the element 18 serving to bear against the depending flange of the plate 17 and one of the tacks 19 not only passes through the element 18 but also through the other end of the plate 17. The element 18 passes through the eye 16 of the corresponding hook as clearly shown in Figure 4.

Obviously, a fishing line is to be tied to the eye 13 and when the lure is pulled through the water, the tendency is for the lure to ride to the right and to the left and in effecting an upward push of the water due to the specific form of the spoon 9, a surface bubbling of the water will occur which will, in addition to the right and left movement of the lure serve to attract live fish.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A fish lure comprising a body having a tapering front end terminating in a substantially rearwardly and downwardly inclined face having a relatively flat lug on its surface, a fish hook carried by the body, a slanting deflector plate at said front end, said plate being elongated transversely of the body and projecting beyond the side portions of the body, said body adjacent said inclined face being provided with a transverse groove at the upper part thereof, said plate having an opening therein adapted to receive said lug, one edge of said opening being seated in the groove, a lug on the lower portion of the plate, and securing means between said last named lug and the body.

ERVIN G. HARMAN.